(12) United States Patent
Righi et al.

(10) Patent No.: US 8,826,080 B2
(45) Date of Patent: Sep. 2, 2014

(54) METHODS AND SYSTEMS FOR PREBOOT DATA VERIFICATION

(75) Inventors: Luigi P. Righi, Laguna Hills, CA (US); Timothy S. Wickham, Huntington Beach, CA (US); Mark A. Talbot, Huntington Beach, CA (US); Gregory M. Wellbrook, Long Beach, CA (US); Charlie C. Wang, Huntington Beach, CA (US); Oscar Mireles, La Mirada, CA (US); Michael D. Rubin, Leander, TX (US)

(73) Assignee: The Boeing Company, Chicago, IL (US)

( * ) Notice: Subject to any disclaimer, the term of this patent is extended or adjusted under 35 U.S.C. 154(b) by 172 days.

(21) Appl. No.: 13/193,718

(22) Filed: Jul. 29, 2011

(65) Prior Publication Data

US 2013/0031413 A1    Jan. 31, 2013

(51) Int. Cl.
 *G06F 11/00* (2006.01)
(52) U.S. Cl.
 USPC .................................. 714/36; 713/2
(58) Field of Classification Search
 USPC ........................................... 714/36
 See application file for complete search history.

(56) References Cited

U.S. PATENT DOCUMENTS

| 5,379,342 | A | * | 1/1995 | Arnold et al. .................... 380/2 |
| 5,793,943 | A | | 8/1998 | Noll |
| 5,835,695 | A | | 11/1998 | Noll |
| 5,987,605 | A | | 11/1999 | Hill et al. |
| 6,061,788 | A | * | 5/2000 | Reynaud et al. ................. 713/2 |
| 6,185,696 | B1 | | 2/2001 | Noll |
| 6,401,218 | B1 | * | 6/2002 | Linam et al. ..................... 714/25 |
| H2040 | H | * | 8/2002 | Reiser ............................. 701/12 |
| 6,651,188 | B2 | | 11/2003 | Harding et al. |
| 7,024,581 | B1 | * | 4/2006 | Wang et al. ....................... 714/2 |
| 7,146,525 | B2 | | 12/2006 | Han et al. |
| 7,451,304 | B2 | | 11/2008 | Chang et al. |
| 7,558,949 | B2 | * | 7/2009 | Inada et al. ........................ 713/2 |

(Continued)

FOREIGN PATENT DOCUMENTS

| EP | 0939367 A2 | 9/1999 |
| EP | 0939367 A3 | 9/1999 |

OTHER PUBLICATIONS

Extended European Search Report for Application No. 12178371.6-1243; Nov. 15, 2012; 7 pages.

*Primary Examiner* — Kamini Patel
(74) *Attorney, Agent, or Firm* — Armstrong Teadale LLP (57) ABSTRACT

A method for validating the data defining an executable program prior to loading of the data for program execution is described. The method includes calculating a verification number for the data within a primary data storage area, the data defining an executable program, comparing the calculated verification number with a stored number, executing the program within the primary data storage area if the verification number matches the stored number, calculating a verification number for the data within a secondary data storage area, the data within the secondary data storage area defining the same executable program as that within the primary data storage area, if the verification number and the stored number do not match, comparing the calculated verification number for the data within the secondary data storage area with the stored number, causing the program to be executed if the verification number for the data within the secondary data storage area and the stored number match, and indicating a failure if the verification number for the data within the secondary data storage area and stored number do not match.

16 Claims, 4 Drawing Sheets

(56) References Cited

U.S. PATENT DOCUMENTS

| | | | |
|---|---|---|---|
| 7,650,556 B2 | 1/2010 | Lee | |
| 7,669,048 B2 | 2/2010 | Frank et al. | |
| 7,689,861 B1* | 3/2010 | Wang et al. | 714/6.12 |
| 7,783,877 B2 | 8/2010 | Lu | |
| 7,818,556 B2 | 10/2010 | Iima | |
| 7,966,486 B2 | 6/2011 | Huang et al. | |
| 8,356,206 B2* | 1/2013 | Koester | 714/15 |
| 2006/0047944 A1* | 3/2006 | Kilian-Kehr | 713/2 |
| 2007/0130452 A1* | 6/2007 | Muir | 713/1 |
| 2008/0052506 A1 | 2/2008 | Iima et al. | |
| 2008/0086629 A1* | 4/2008 | Dellow | 713/2 |
| 2009/0063834 A1 | 3/2009 | Huang et al. | |
| 2009/0144535 A1 | 6/2009 | Lin et al. | |
| 2009/0158024 A1 | 6/2009 | Hung et al. | |
| 2009/0158025 A1 | 6/2009 | Hung et al. | |
| 2009/0276617 A1* | 11/2009 | Grell et al. | 713/2 |
| 2010/0023741 A1* | 1/2010 | Wang | 713/2 |
| 2010/0082963 A1 | 4/2010 | Li et al. | |
| 2010/0235646 A1* | 9/2010 | Fu et al. | 713/186 |
| 2010/0268967 A1* | 10/2010 | Senda | 713/193 |
| 2011/0093741 A1 | 4/2011 | Liang et al. | |
| 2011/0219458 A1* | 9/2011 | Labarre et al. | 726/26 |
| 2011/0289280 A1* | 11/2011 | Koseki et al. | 711/154 |
| 2012/0159256 A1* | 6/2012 | Havewala et al. | 714/37 |

* cited by examiner

METHODS AND SYSTEMS FOR PREBOOT DATA VERIFICATION

BACKGROUND

The field of the disclosure relates generally to the startup of computer-based systems that incorporate a BIOS (basic input/output system) that initiates execution of one or more programs, and more particularly to methods and systems that incorporate preboot data verification for such programs.

Generally, when power is first applied to a computer system, a startup program is run that is stored in non-volatile memory. Such a startup program may be referred to as boot firmware, and is colloquially referred to as a BIOS program. The BIOS program is executed in computer systems that range from a standard personal computer to an embedded system that is deployed as a piece of avionics (e.g., an avionics unit or "black box") in an aircraft.

Execution of a BIOS program is useful to detect and identify system components that are communicatively coupled to the processing device on which the BIOS is being executed. For example, computer hard drives, displays, and external memory devices are identified and addressed through execution of the BIOS such that software drivers for such devices may be loaded upon the BIOS turning operation over to an operating system. In some applications, the BIOS may include software that initiates a built in test (BIT) to be run; thereby determining that the hard drives, displays, etc. are at least partially operating. That is, the processor is able to communicate with the device. Eventually the BIOS execution is complete, with a portion of the BIOS instructions causing the operating system, or in the case of an aircraft system, the operational flight program (OFP), associated with the device to begin its operations.

In such systems, the BIOS operates to initiate execution of the operating system or OFP. However, the BIOS does not include any instructions that allow it to verify the content of the operating system or OFP. As such, if the operating systems, OFP, or any other application is corrupted, operation of the particular system may be compromised, or it will not operate at all.

In the aircraft avionics example, problems during execution of the OFP from the BIOS or boot ROM are a cause of false remove and replace actions. For example, if the device does not execute the OFP properly, the avionics device is removed and replaced, with the removed device being sent to a maintenance depot. Oftentimes, the problem with the removed device as described cannot be duplicated or it is determined that the OFP is corrupted. As such, the repair consists of the OFP being reloaded, retested, and returned to service.

BRIEF DESCRIPTION

In one aspect, a method for validating data defining an executable program prior to loading of the data for program execution is provided. The method includes calculating a verification number for the data within a primary data storage area, the data defining an executable program, comparing the calculated verification number with a stored number, executing the program within the primary data storage area if the verification number matches the stored number, calculating a verification number for the data defining the same executable program as that within the primary data storage area within a secondary data storage area. If the verification number and stored number do not match, comparing the calculated verification number for the data within the secondary data storage area with the stored number, causing the program to be executed if the verification number for the data within the secondary data storage area and the stored number match, and indicating a failure if the verification number for the data within the secondary data storage area and stored number do not match.

In another aspect, a device is provided that includes a processing unit, a boot ROM from which a basic input/output system is executed by the processing unit, a primary data storage area configured to store an image of an executable application associated with the device, and at least one secondary data storage area configured to store at least one additional image of the executable application associated with the device. The device is programmed to calculate a separate verification number for the image stored within the primary data storage area and each image stored within at least one secondary data storage area, compare the calculated separate verification number for each image with a stored number in the boot ROM, copy the image from one of the primary and secondary data storage areas where the calculated verification number for the image matches the stored number to any primary or secondary data storage area where the calculated separate verification number for the image did not match the stored number, and execute the program defined by the stored image from one of the primary and secondary data storage areas.

In still another aspect, one or more computer-readable storage media having computer-executable instructions embodied thereon are provided. At least a portion of the storage media includes data representing a checksum associated with an executable application. When executed by at least one processor, the computer-executable instructions cause at least one processor to calculate a separate verification number for data within a plurality of data storage areas, the data within each data storage area defining the same executable program, compare the calculated separate verification number for each of the plurality of data storage areas with a stored number, copy the data from one of the plurality of data storage areas where the calculated separate verification number matches the stored number to any of the plurality of data storage areas where the calculated verification number did not match the stored number, and execute the program defined by the stored data from one of the plurality of data storage areas.

In yet another aspect, a method for execution of a program from a memory source is provided. The method includes calculating a separate verification number for data within a plurality of data storage areas, the data within each data storage area defining the same executable program, comparing the calculated separate verification number for each of the data storage areas with a stored number, copying the data from one of the plurality of data storage areas where the calculated separate verification number matched the stored number to any of the plurality of data storage areas where the calculated separate verification number did not match the stored number, and executing the program defined by stored data from one of the plurality of data storage areas.

The features, functions, and advantages that have been discussed can be achieved independently in various embodiments or may be combined in yet other embodiments further details of which can be seen with reference to the following description and drawings.

DETAILED DESCRIPTION

The described embodiments are directed to the validation of data (e.g., operating system files, applications, and other information needed to initialize a computer system, including for example critical system files, kernel files, configuration files, etc.) that are stored in, for example a non-volatile memory, before that data is loaded for execution. In the exemplary embodiment, if the validation test fails (e.g., a checksum test fails), a secondary source of the same data may be utilized. If the secondary source of data passes the validation test, the data is loaded from the memory associated with the secondary source and executed. In certain embodiments, the validated copy of data in the secondary source might overwrite the data that could not be validated in the primary memory. As memory devices continue to increase in capacity and reduce in physical size, it is possible to envision three, four, five, and up to n sources of data, which would allow for multiple attempts at loading applications for execution before an indication of a failure would occur. Such embodiments also provide an ability to overwrite any corrupt files with valid files from the other sources thereby providing a "self repair" functionality.

As described herein, additional instructions are added to a basic input/output system (BIOS). The instructions cause a verification of data that constitutes, for example, the contents of an operating system, an application and other stored information to initialize a system, to be performed. In a simple example, instructions executed in the BIOS cause a checksum to be calculated for the operational flight program (OFP) of an avionics unit stored in a non-volatile memory, intended to be executed by the avionics unit or "black box". The BIOS further verifies that the calculated checksum is equal to a stored checksum for the OFP, the checksum stored, for example, in a memory associated with the BIOS.

Figure 1:
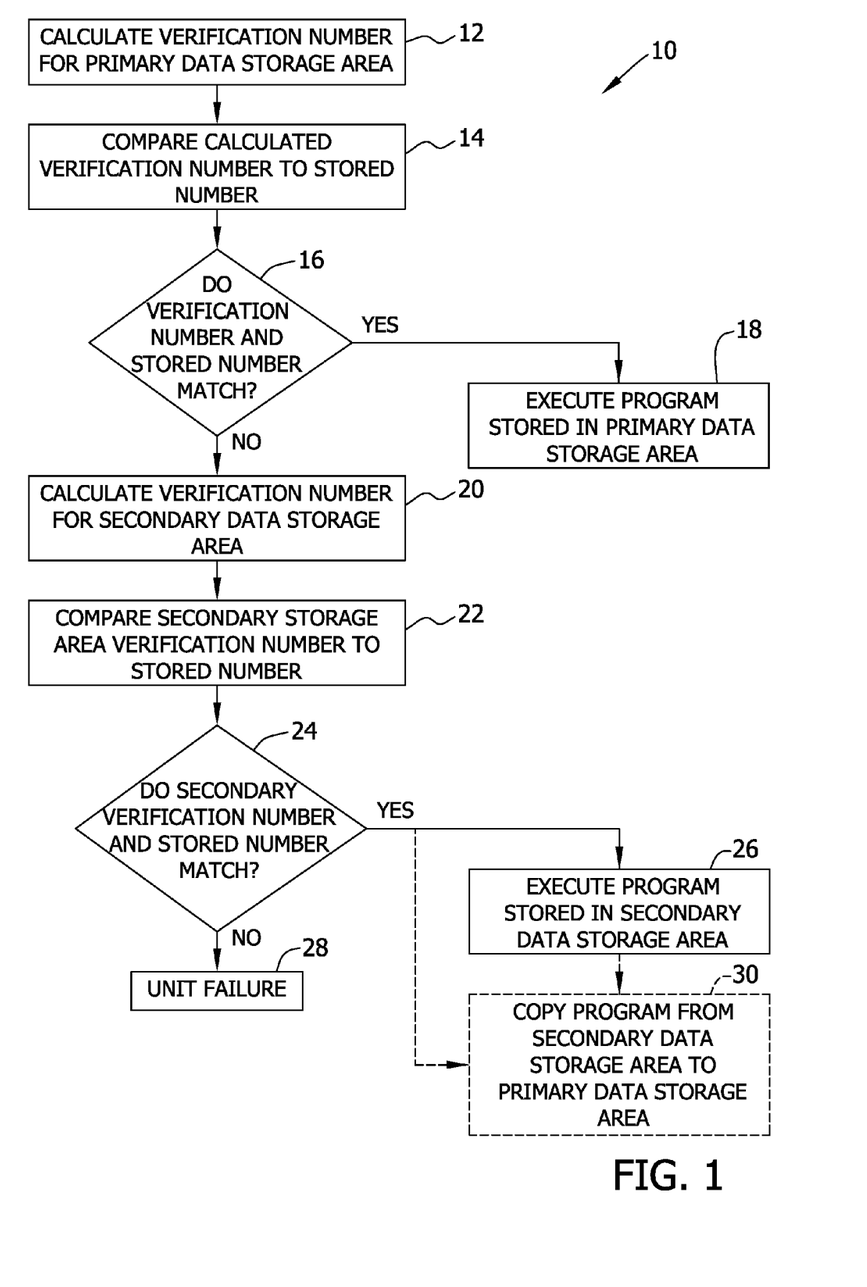
FIG. 1 is a flowchart of a verification process.

As further explained with respect to FIG. 1, if the checksums are equal, the BIOS allows and/or causes the OFP to be run. If the checksums are not equal, the BIOS moves on to another memory location where another instance of the OFP is stored, causes the checksum to be calculated, and verified against the stored checksum. The process can be repeated for multiple mirror images of the OFP, until an image with a verifiable checksum is found, at which point that image can then be executed or transferred into a memory from which it is able to be executed. Further the image of the OFP that passes the checksum verification test may be copied into the memory locations at which the checksum could not be verified, presumably generating verifiable copies of the OFP that can be run in future boot ups of the system. In this embodiment, the boot ROM from which the BIOS is executed is configured with the locations (in memory) of the secondary (tertiary, etc.) sources of data.

The above described concepts are more easily visualized using the flowchart 10 of FIG. 1. While the actual sequence may be executed in a number of ways, all are consistent in that one or more secondary sources of data are accessible by a processing function for loading, execution, and replacement of primary sources of data. Referring to flowchart 10, a verification number for a primary data storage area is calculated 12 and the calculated verification number is compared 14 to a stored number such as a checksum. If the verification number and stored number match 16, the program stored in the primary data storage area is loaded and executed 18.

If the verification number and stored number do not match 16, a verification number for a secondary data storage area, which should include an exact copy of the data that should have been in the primary data storage area, is calculated 20. The verification number calculated 20 for the secondary data storage area is compared 22 to the stored number. If the verification number and stored number associated with the secondary data storage area match 24, the program stored in the secondary data storage area is executed 26.

If the verification number and stored number associated with the secondary data storage area do not match 24, it can be assumed that the unit has failed 28. Execution of the program from the secondary data storage area can be accomplished in a number of ways. The program may be executed 26 directly from the secondary data storage area, or the data from the secondary data storage area may be copied 30 to the primary data storage area such that it might be executed from the primary data storage area. Alternatively, the program may be executed from the secondary data storage area and then copied 30 over into the primary storage area as a self-repair function once the program is loaded. In another embodiment, the program stored in the secondary data storage area is loaded into a memory from which the program can be executed.

In the simplest example associated with FIG. 1, should the data verification function (comparison between calculated and stored numbers) pass with regard to a primary memory location, the program at such memory location is executed 18. However, those skilled in the art will understand that the process illustrated by FIG. 1 need not be limited to two data storage areas. It is contemplated that in certain applications that the data verification function will be performed with respect to n data storage areas.

Figure 2:
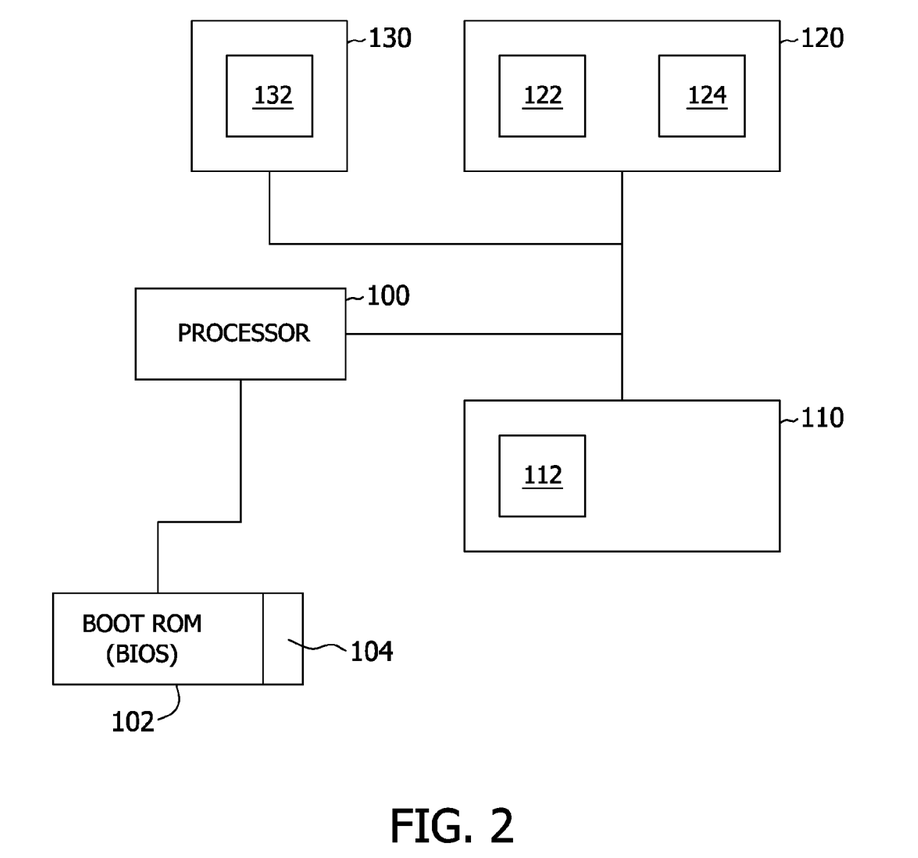
FIG. 2 is a diagram of a processing system illustrating multiple images of an application within various memory areas.

Particularly, calculation of a verification number may include calculating a value such as a checksum. FIG. 2 illustrates that the primary data storage area, secondary data storage area, tertiary data storages area and so on may be embodied in multiple ways. In FIG. 2, a processor 100 is coupled to a boot ROM device 102 in which a BIOS is stored. A portion of the boot ROM device 102 stores a checksum 104 for an application (or multiple checksums for multiple applications) to be executed by processor 100. Memory 110 contains the primary image 112 of the application to be executed. As described herein, the device incorporating processor 100, boot ROM 102 and memory 110 may be configured to include multiple memory devices, for example memory devices 120 and 130. As shown in the example of FIG. 2, memory device 120 is configured with two images (122 and 124) of the application to be executed and memory device 130 is configured a single image 132 of the application to be executed.

In the example of memory device 120, the data storage areas may be separate partitions in a single memory device. In another example, the data storage areas may be embodied as physically separate memory devices (e.g., a hard drive, silicon memory devices, a CD-ROM, a flash drive, a thumb drive, etc.). In still another example, the data storage areas may be embodied as physically separate devices of the same type (e.g., memory devices on separate circuit boards). Again, a multitude of physical memory device embodiments and configuration combinations may be utilized to achieve the functionality described herein.

Further, the embodiments are not limited to operational flight programs. Data to be validated may include an operating system, applications, and/or other information needed to initialize a system that is stored in a memory. In the embodiments, the data stored in a memory is validated (verified) before it is loaded for execution or before the BIOS transfers control of the system to an operating system. If the validation fails, a secondary source of such data is utilized, assuming it also passes a verification test.

In addition, data from one of the secondary data sources can be loaded from memory and copied over to the primary data memory. For example, and referring again to FIG. 2, if image 112 is the primary image and the verification calculated for image 112 does not match the checksum 104 stored in the boot ROM 102, and image 132 does match the checksum stored in boot ROM 102, the boot ROM 102 may be configured to include instructions that would copy the image 132 into memory 110, overwriting the image 112, which for purposes of describing the embodiments, may be considered as having been corrupted.

In certain applications, for example, the above described aircraft avionics system, the multiple copies of the software and data needed for operation in various different locations results in a system that has a high degree of redundancy allowing for the automatic correction of issues that would prevent boot-up and ultimately system operation. In the case where there is an operator, the function is automated and saves time.

In one embodiment, technical effects of the methods, systems, and computer-readable media described herein include at least one of: (a) verifying that the data making up an executable program within the data storage area of a device is as expected via, for example, a checksum of such data being equal to a stored checksum (b) executing the program associated with the data storage device if the verification test passes, (c) attempting to verify that the data making up the executable program within a different data storage area of a device is as expected via, for example, a checksum of such data being equal to a stored checksum, (d) executing the program from the different data storage device if the verification test passes, and (e) potentially copying the program from the different data storage area to the original data storage area such that the device can execute the program from the original data storage area at a later time.

Figure 3:
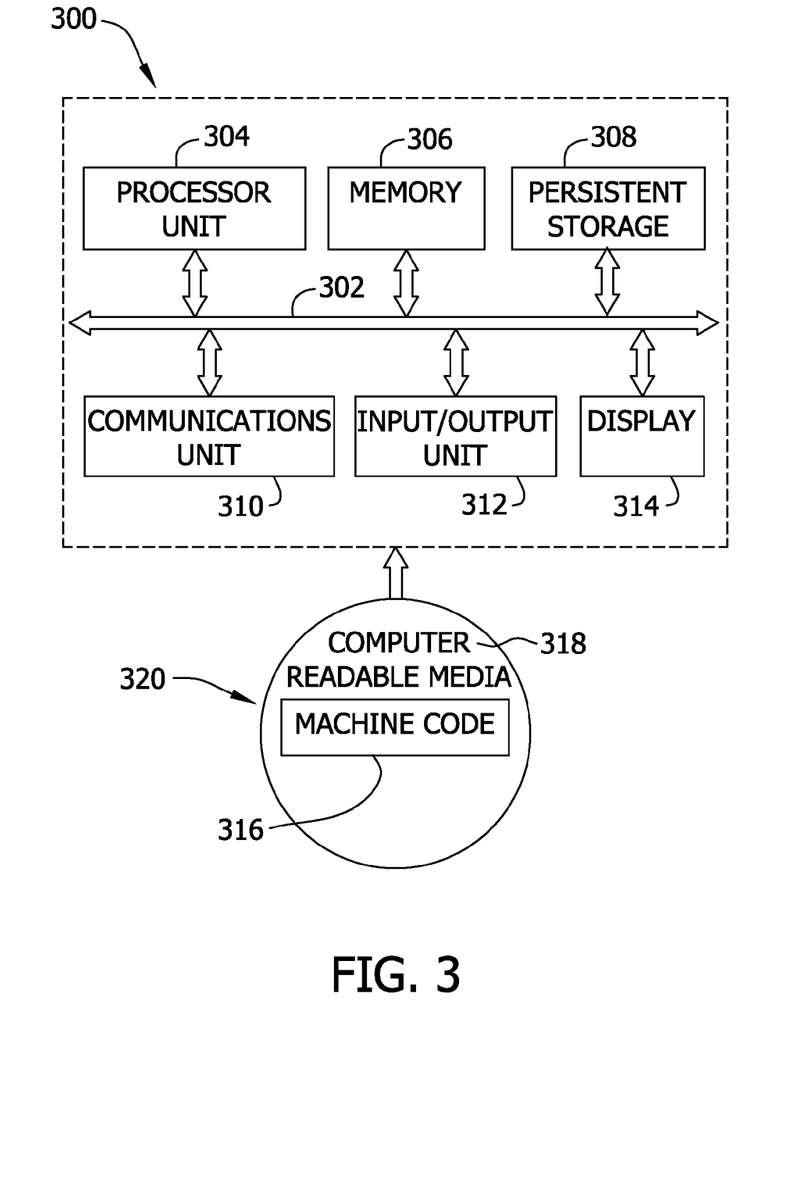
FIG. 3 is a diagram of a data processing system.

Turning now to FIG. 3, a more detailed diagram of a data processing system is depicted in accordance with an illustrative embodiment. In this illustrative example, data processing system 300 includes communications fabric 302, which provides communications between processor unit 304, memory 306, persistent storage 308, communications unit 310, input/output (I/O) unit 312, and display 314. In various embodiments, system 300 is representative of a general purpose personal computer or an aircraft avionics unit.

Processor unit 304 serves to execute instructions for software that may be loaded into memory 306. Processor unit 304 may be a set of one or more processors or may be a multi-core processor, depending on the particular implementation. Further, processor unit 304 may be implemented using one or more heterogeneous processor systems in which a variety of different types of processors are present on a single chip. As another illustrative example, processor unit 304 may be a symmetric multi-processor system containing multiple processors of the same type.

Memory 306 and persistent storage 308 are examples of various storage devices within which an image (or images) of an application, such as an OFP, may be stored. As used herein, a storage device or memory is any piece of hardware that is capable of storing information either on a temporary basis or a permanent basis. Memory 306, in these examples, may be, for example, without limitation, a random access memory (RAM) or any other suitable volatile or non-volatile silicon-based memory device. A portion of memory 306 may be configured as a boot ROM device as described in the preceding paragraphs. Persistent storage 308 may take various forms depending on the particular implementation. For example, without limitation, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, without limitation, a removable hard drive may be used for persistent storage 308.

Communications unit 310, in these examples, provides for communications with other data processing systems or devices. In these examples, communications unit 310 is a network interface card (NIC). Communications unit 310 may provide communications through the use of either or both physical and wireless communication links.

Input/output unit 312 allows for input and output of data with other devices that may be connected to data processing system 300. For example, without limitation, input/output unit 312 may provide a connection for user input through a keyboard and mouse. Further, input/output unit 312 may send output to a printer. Display 314 provides a mechanism to display information to a user.

Instructions for the operating system and applications, or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as machine code, which may be read and executed by a processor in processor unit 304. The machine code in the different embodiments may be embodied on different physical or tangible computer readable media, such as memory 306 or persistent storage 308.

Alternatively or in addition, machine code 316 is located in a functional form on computer readable media 318 that is selectively removable and may be loaded onto or transferred to data processing system 300 for execution by processor unit 304. Machine code 316 and computer readable media 318 form a computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer readable media 318 may not be removable.

Alternatively, machine code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the machine code.

In some illustrative embodiments, machine code 316 may be downloaded over a network to persistent storage 308 from another device or data processing system for use within data processing system 300. For instance, machine code stored in a computer readable storage medium in a data processing server may be downloaded over a network from the server to data processing system 300. The data processing server providing machine code 316 may be a host computer, a client computer, or some other device capable of storing and transmitting machine code 316.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308 and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 306 or a cache such as that found via an interface to an external memory or memory controller that may be accessed via communications fabric 302.

Figure 4:
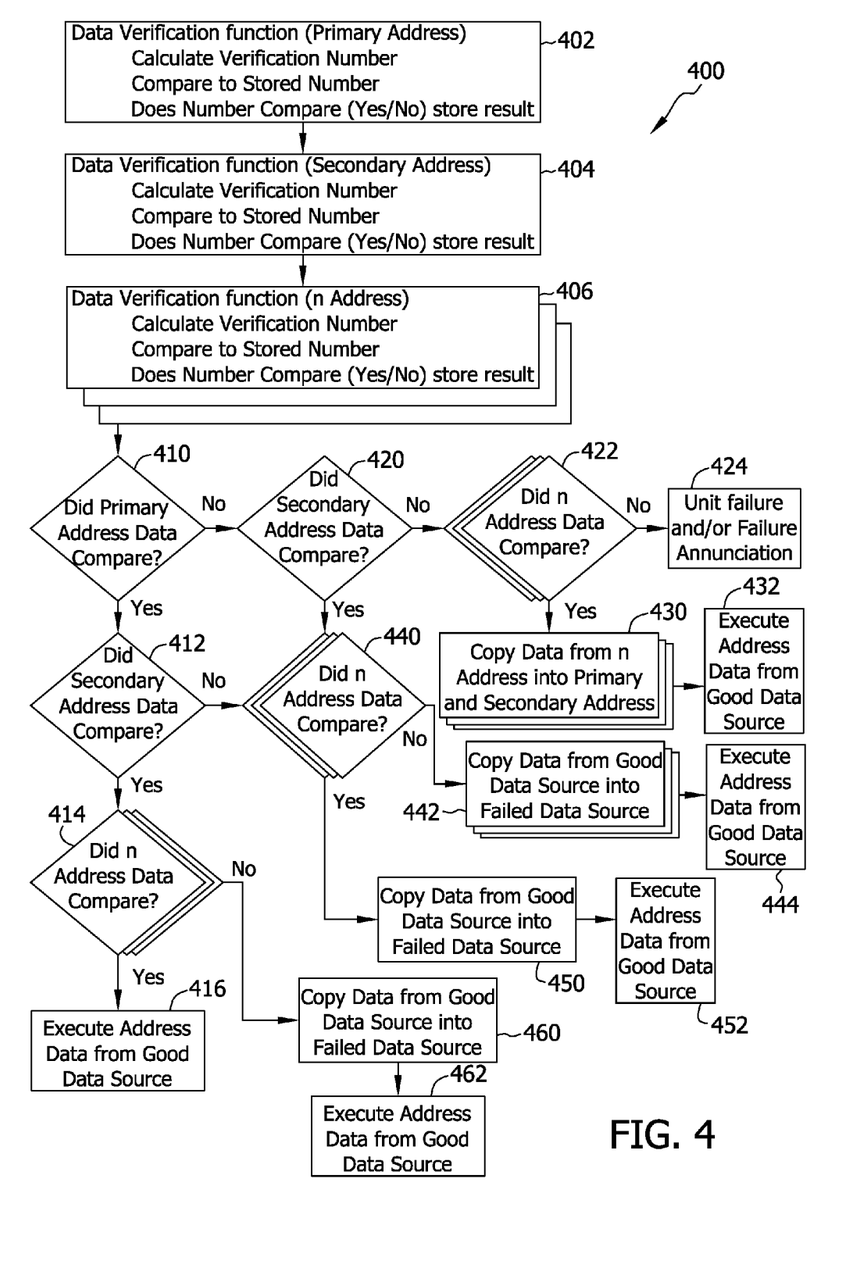
FIG. 4 is a flowchart illustrating an alternative implementation of a verification process.

FIG. 4 is a flowchart 400 illustrating an alternative implementation of a verification process. The above described embodiments described a process where a system calculates checksums of program storage areas until a program storage area with an appropriate checksum is found, whereupon the program is executed from that storage area. Flowchart 400 illustrates a process where all of the program storage areas are verified, even though the first program storage area may have passed the checksum test. By verifying the contents of all the program storage areas, the scenario is avoided where program storage areas 2 through n are corrupted, but such corruption goes undetected because program storage area 1 has always passed the verification test. If the corruption of program storage areas 2 through n go undetected, should program storage area 1 ever not pass the verification test, the unit incorporating the program storage areas 1 through n would unnecessarily be rendered inoperable.

Referring now to flowchart 400, a data verification function for a primary address (program storage area 1) is performed 402. Specifically, a verification number is calculated, compared to a stored number, and a result of the comparison is stored, similar to that described in the preceding paragraphs. The data verification function is performed 404 for a secondary address (program storage area 2), with the result stored, as well as performed 406 for the remainder of the n addresses (program storage areas n), with the results stored.

In one scenario, all of the program storage areas pass the verification testing. Specifically, it is verified that the comparison 410 at the primary address passed, that the comparison 412 at the secondary address passed, and that the comparison 414 at the n addresses passed, at which point the program is executed 416 from the primary address.

In another scenario, many or all of the program storage areas do not pass the verification testing. Specifically, when it is verified that the comparison 410 at the primary address did not pass, that the comparison 420 at the secondary address did not pass, and that the comparison 422 at one or more of the n addresses did not pass, the program is eventually executed 432 from one of the n addresses where the verification test eventually passed, if any. If none of the n addresses pass, a unit failure 424 occurs and may be annunciated (e.g., reported). However, if the comparison 422 at one of the n addresses does pass, the data from that program storage area is copied 430 into the primary program area, the secondary program storage area, and any of the n program storage areas where the comparison did not pass. Then, the program is executed 432 from either the primary program storage area, secondary program storage area or one of the n program storage areas where the comparison did pass.

In the scenario where the comparison 410 at the primary address did not pass, the comparison 420 at the secondary address did pass, but at least one of the comparisons 440 at one or more of the n addresses did not pass, data from the secondary program storage area is copied 442 into the primary program storage area and any of the nth program storage areas where the comparison did not pass, and the program is eventually executed 444 either from the primary program storage area, secondary program storage area or one of the n program storage areas.

Similarly, in the scenario where the comparison 410 at the primary address did not pass, the comparison 420 at the secondary address did pass, and all of the comparisons 440 at the n addresses did pass, data from one of the secondary program storage area or the n program storage areas is copied 450 into the primary program storage area, and the program is eventually executed 452 either from the primary program storage area, secondary program storage area or one of the n program storage areas.

Finally, in the scenario where the comparison 410 at the primary address did pass, the comparison 412 at the secondary address did pass, and at least one of the comparisons 414 at the n addresses did not pass, data from one of the primary program storage area or the secondary program storage area is copied 460 into the n program storage areas where the comparison 414 did not pass, and the program is eventually executed 462 either from the primary program storage area, the secondary program storage area or one of the n program storage areas.

The above described method and system configurations are operable for assured execution of a program even though the primary storage location for that program may become corrupted. Previously, and especially in the tightly constrained spaces and weights associated with aircraft avionics systems, physical space for additional memory simply was not available for storage of "extra" program images. However, as memory devices continue to reduce in physical size, while also growing in storage capacity, the configurations described herein have become feasible. The embodiments allow for a reduction in the removal occurrences of units from aircraft for repair, since the units, at least at a certain level, are self repairing, through the copying of a confirmed "good" application image into the memory space where a potentially corrupted image of the program has been stored.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for validating data defining an executable program prior to loading of the data for program execution, the method comprising:
    calculating a verification number for the data within a primary data storage area, the data defining an executable program;
    comparing the calculated verification number with a stored number;
    determining that the verification number does not match the stored number;
    based on the determination that the verification number does not match the stored number, calculating a second verification number for data within a secondary data storage area, the data within the secondary data storage area defining the same executable program as that within the primary data storage area;
    comparing the calculated second verification number for the data within the secondary data storage area with the stored number;
    determining that the calculated second verification number and the stored number match;
    based on the determination that the calculated second verification number and the stored number match:
        overwriting the data within the primary data storage area with the data within the secondary data storage; and
        causing the program to be executed.

2. The method according to claim 1 further comprising copying the data within the secondary storage area into the primary storage area.

3. The method according to claim 1 wherein calculating a verification number for the data comprises calculating a checksum of an operational flight program for an aircraft avionics device.

4. The method according to claim 1 wherein calculating a verification number for the data comprises executing instructions within a boot read-only memory (ROM) device to calculate a checksum of the data defining the executable program.

5. The method according to claim 1 wherein comparing the calculated second verification number for the data within the secondary data storage area with a stored number comprises comparing the calculated second verification number with a number stored in a memory associated with a basic input/output system.

6. A device comprising:
    a boot read-only memory (ROM) from which a basic input/output system is executed by a processing unit;
    a primary data storage area configured to store an image of an executable application associated with the device; and
    at least one secondary data storage area configured to store an additional image of the executable application associated with the device; and
    a processor programmed to:
        calculate a verification number for the image stored within the primary data storage area;
        compare the calculated verification number for the image stored within the primary data storage area with a stored number in the boot ROM;
        determine that the verification number for the image stored within the primary data storage area does not match the stored number;
        based on the determination that the verification number for the image stored within the primary data storage area does not match the stored number, calculate a second verification number for the additional image within the at least one secondary data storage area, data corresponding to the additional image within the at least one secondary data storage area defining the same executable program as that within the primary data storage area;
        determine that the calculated second verification number and the stored number match;
        overwrite the image from the primary data storage area with the additional image of the executable application associated with the device; and
        execute the program defined by the additional image from the secondary data storage area.

7. The device according to claim 6 wherein said device comprises an aircraft avionics unit.

8. The device according to claim 7 wherein the image stored in said primary storage area and the additional image stored in said at least one secondary data storage area comprise an operational flight program, and wherein the calculated verification number comprises a checksum for the operational flight program.

9. The device according to claim 6 wherein said at least one secondary data storage area comprises one or more of the following: a silicon memory device, a computer hard drive, a CD-ROM, a flash drive, and a thumb drive.

10. One or more non-transitory computer-readable storage media having computer-executable instructions embodied thereon, at least a portion of said storage media comprising data representing a checksum associated with an executable application, wherein when executed by at least one processor, the computer-executable instructions cause the at least one processor to:
    calculate a verification number for data within a primary data storage area, the data within the primary data storage area defining an executable program;
    compare the calculated verification number for primary data storage area with a stored number;

determine that the calculated verification number does not match the stored number;

based on the determination that the verification number does not match the stored number, calculate a second verification number for data within a secondary data storage area, the data within the secondary data storage area defining the same executable program as that within the primary data storage area;

compare the calculated second verification number for the data within the secondary data storage area with the stored number;

determine that the calculated second verification number for the data within the secondary data storage area and the stored number match;

based on the determination that the calculated second verification number for the data within the secondary data storage area and the stored number match:

overwrite the data from the primary data storage area with the data from the secondary data storage area; and     execute the program defined by the data from the secondary data storage area.

11. One or more non-transitory computer-readable storage media according to claim 10 wherein the executable application comprises an operational flight program.

12. A method for execution of a program from a memory, said method comprising:

calculating a verification number for data within each of a plurality of data storage areas, the data within each data storage area defining the same executable program;

comparing the calculated verification number for each of the plurality of data storage areas with a stored number;

determining that the calculated verification number for a first data storage area of the plurality of data storage areas does not match the stored number;

determining that the calculated verification number for a second data storage area of the plurality of data storage areas matches the stored number; and     executing the program defined by data from the second data storage area.

13. The method according to claim 12 wherein calculating a verification number comprises at least one of:

calculating a checksum of an operational flight program for an aircraft avionics device; and     executing instructions within a boot ROM device to calculate a checksum of the data defining the same executable program.

14. The method according to claim 12, further comprising, prior to executing the program defined by stored data from the second data storage area, overwriting the data from first data storage area with the data from the second data storage area.

15. The method according to claim 12, further comprising, prior to executing the program defined by stored data from the second data storage area, copying the data from the second data storage area to the to the first data storage area.

16. The method according to claim 12, wherein the program defined by data from the second data storage area is executed directly from the second data storage area.

\* \* \* \* \*